(12) United States Patent
Liong et al.

(10) Patent No.: US 12,183,088 B2
(45) Date of Patent: Dec. 31, 2024

(54) IDENTIFYING OBJECTS USING LiDAR

(71) Applicant: Motional AD LLC, Boston, MA (US)

(72) Inventors: Venice Erin Baylon Liong, Singapore (SG); Tho Thi Ngoc Nguyen, Singapore (SG)

(73) Assignee: Motional AD LLC, Boston, MA (US)

( * ) Notice: Subject to any disclaimer, the term of this patent is extended or adjusted under 35 U.S.C. 154(b) by 480 days.

(21) Appl. No.: 17/504,449

(22) Filed: Oct. 18, 2021

(65) Prior Publication Data

US 2022/0122363 A1 Apr. 21, 2022

Related U.S. Application Data

(60) Provisional application No. 63/094,809, filed on Oct. 21, 2020.

(51) Int. Cl.
| | |
|---|---|
| *G06V 20/58* | (2022.01) |
| *G01S 7/48* | (2006.01) |
| *G01S 17/89* | (2020.01) |
| *G01S 17/931* | (2020.01) |
| *G05B 13/02* | (2006.01) |
| *G06F 18/24* | (2023.01) |
| *G06V 10/764* | (2022.01) |
| *G06V 10/80* | (2022.01) |
| *G06V 10/82* | (2022.01) |

(52) U.S. Cl.
CPC ............ *G06V 20/58* (2022.01); *G01S 7/4802* (2013.01); *G01S 17/89* (2013.01); *G01S 17/931* (2020.01); *G05B 13/027* (2013.01); *G06F 18/24* (2023.01); *G06V 10/764* (2022.01); *G06V 10/809* (2022.01); *G06V 10/82* (2022.01)

(58) Field of Classification Search
None
See application file for complete search history.

(56) References Cited

U.S. PATENT DOCUMENTS

| | | |
|---|---|---|
| 10,366,502 B1 | 7/2019 | Li |
| 10,810,445 B1 | 10/2020 | Kangaspunta |
| 10,860,034 B1 | 12/2020 | Ziyaee et al. |
| 11,022,693 B1 | 6/2021 | Allais et al. |

(Continued)

FOREIGN PATENT DOCUMENTS

| | | |
|---|---|---|
| CN | 111338336 | 6/2020 |
| CN | 111460193 | 7/2020 |
| CN | 113508066 | 10/2021 |

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

(Continued)

*Primary Examiner* — Hovhannes Baghdasaryan
(74) *Attorney, Agent, or Firm* — Fish & Richardson P.C.

(57) ABSTRACT

Among other things, techniques are described for controlling, using a control circuit, motion of a vehicle based objects identified using LiDAR. For example, respective classes of points of a point cloud are determined, and based on the determined respective classes of the points of the point cloud, objects in the vicinity of the vehicle are identified.

24 Claims, 13 Drawing Sheets

(56) References Cited

U.S. PATENT DOCUMENTS

| | | |
|---|---|---|
| 11,691,648 B2* | 7/2023 | Theverapperuma ... G06V 10/82 701/25 |
| 2019/0147610 A1* | 5/2019 | Frossard ............... G06N 3/045 382/103 |
| 2019/0243371 A1* | 8/2019 | Nister .................... G05D 1/027 |
| 2019/0258878 A1* | 8/2019 | Koivisto ............... G06N 3/084 |
| 2019/0266418 A1* | 8/2019 | Xu ........................ G06V 10/457 |
| 2019/0303982 A1* | 10/2019 | Michel .................. B64C 39/024 |
| 2020/0074190 A1* | 3/2020 | Khakharia ............. G06N 3/045 |
| 2020/0082560 A1* | 3/2020 | Nezhadarya ............ G06T 17/10 |
| 2020/0233429 A1 | 7/2020 | Zhang et al. |
| 2020/0294257 A1* | 9/2020 | Yoo ....................... G06N 3/045 |
| 2021/0150230 A1 | 5/2021 | Smolyanskiy et al. |
| 2022/0114807 A1* | 4/2022 | Iancu ................... G06V 10/809 |

OTHER PUBLICATIONS

Chen et al., "Multi-View 3D Object Detection Network for Autonomous Driving," Proceedings of the IEEE Conference on Computer Vision and Pattern Recognition, 2017, pp. 1907-1915.

Liong et al., "AMVNet: Assertion-based Multi-View Fusion Network for LiDAR Semantic Segmentation," arXiv Preprint arXiv:2012.04934, Dec. 2020, 10 pages.

Zhou et al., "End-to-End Multi-View Fusion for 3D Object Detection in LiDAR Point Clouds," Conference on Robot Learning, Osaka, Japan, Oct. 30-Nov. 1, 2019; Proceedings of Machine Learning Research, May 2020, 100:923-932.

Hu et al., "Vehicle target detection method based on LIDAR point cloud and image fusion," Journal of Automotive Safety and Energy Conservation, Dec. 15, 2019, 10(4):451-458 (Abstract with English translation).

* cited by examiner

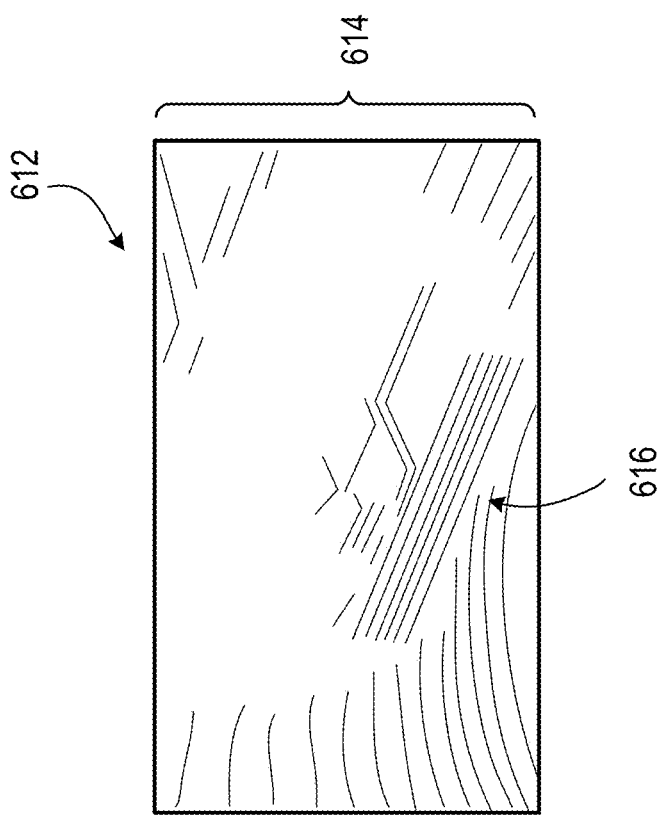
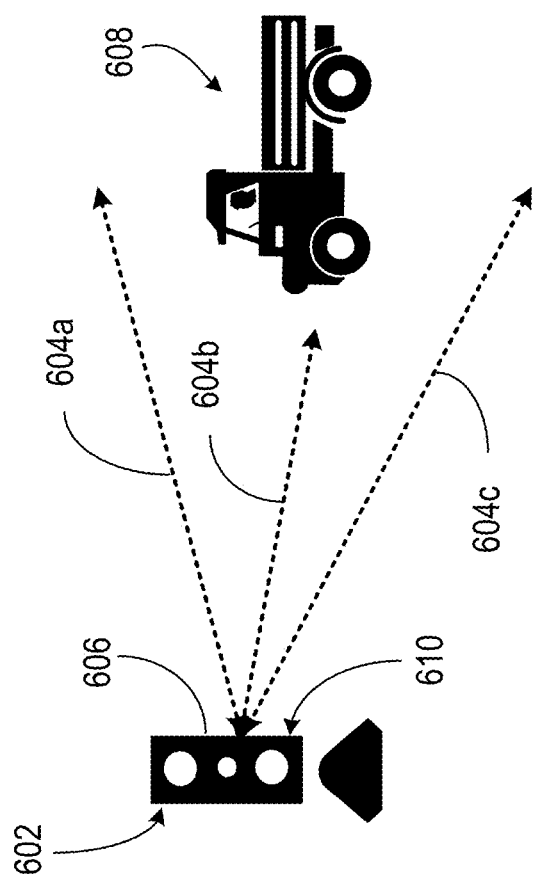
FIG. 6

IDENTIFYING OBJECTS USING LiDAR

CROSS-REFERENCE TO RELATED APPLICATIONS

This application claims priority to U.S. Provisional Application No. 63/094,809, filed Oct. 21, 2020, the entire contents of is incorporated herein by reference.

FIELD OF THE INVENTION

This description relates to identifying objects using light detection and ranging ("LiDAR").

BACKGROUND

LiDAR is a technology that uses light to obtain data about physical objects in line of sight of a light emitter. LiDAR data typically takes the form of collections of points (also known as point clouds) that are used to construct a representation of the surrounding environment. LiDAR can be used to detect objects near a vehicle.

BRIEF DESCRIPTION OF THE DRAWINGS

FIG. 6 shows an example of a LiDAR system.

DETAILED DESCRIPTION

Figure 1:
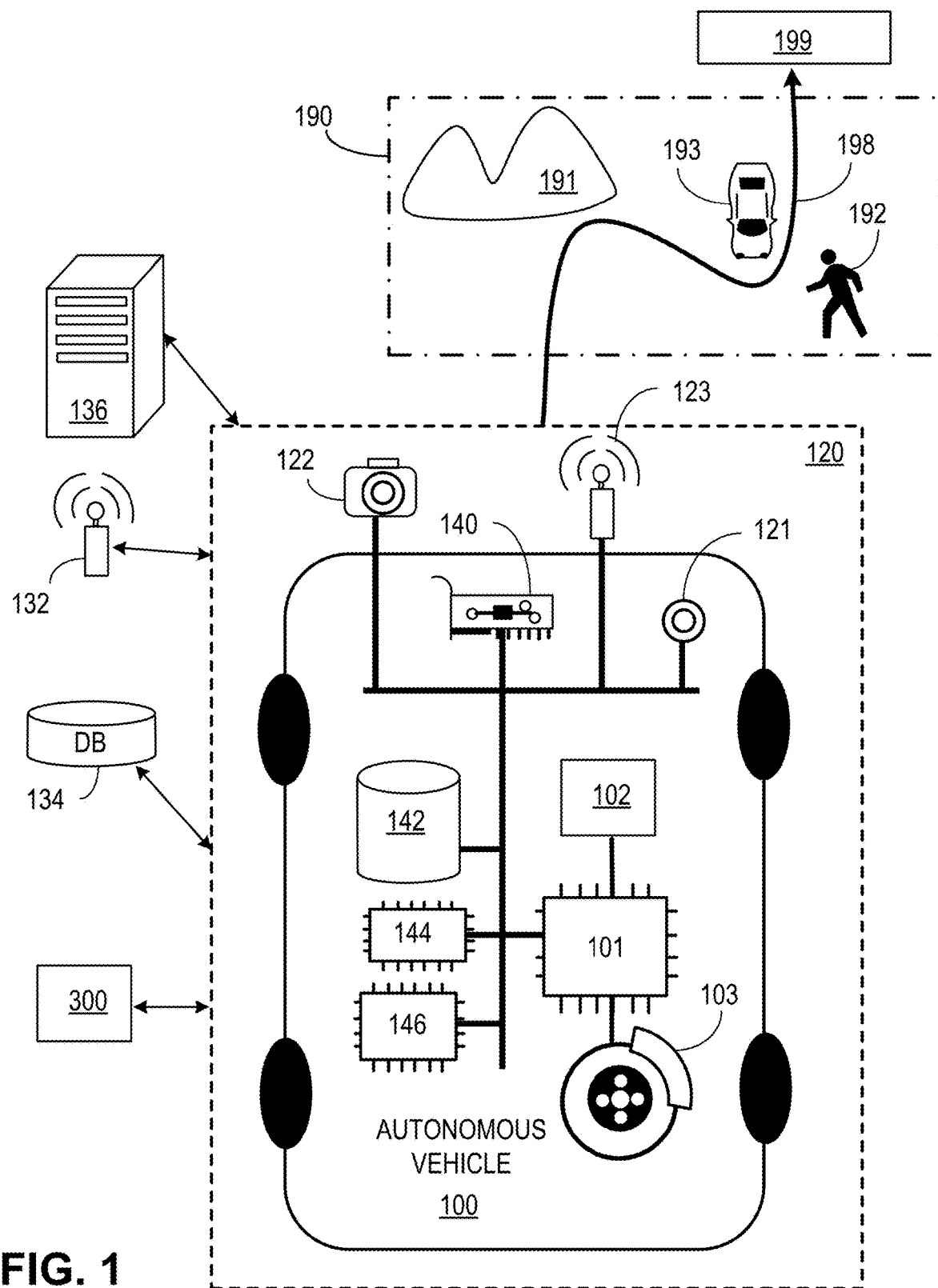
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Identifying Objects Using Multi-View Fusion General Overview Multiple views of a LiDAR scan are processed in parallel, and the results are combined to generate semantic labels for clusters of points included in a LiDAR point cloud. For example, output from a Birds-eye View (BeV) neural network and output from a Range View (RV) neural network are compared and combined (i.e., "fused") to generate a finalized set of labels. Labeled point clouds are then used to identify objects near a vehicle, e.g., for the purpose of navigation.

Some of the advantages of the new approach include: The use of parallel training and deployment of separate view networks, also known as view neural networks, (e.g., the BeV and RV networks, described above) to reduce the amount of computational resources needed to identify objects near a vehicle. Additionally, or alternatively, this approach enables networks to function even when a subset of the separate view networks is not providing outputs as expected. A recurrent layer used for spatial smoothing is added to each of the view networks to learn the spatial relationship between objects for the purpose of removing boundary errors and improving accuracy. Data augmentation from a single LiDAR scan increases the number of available training samples for better training of the overall network. Fusing the output of the view networks generates more accurate classification results of the points than if the views were considered independently.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the vehicle 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, include instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) and Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication devices 140 transmit data collected from sensors 121 or other data related to the operation of vehicle 100 to the remotely located database 134. In an embodiment, communication devices 140 transmit information that relates to teleoperations to the vehicle 100. In some embodiments, the vehicle 100 communicates with other remote (e.g., "cloud") servers 136.

In an embodiment, the remotely located database 134 also stores and transmits digital data (e.g., storing data such as road and street locations). Such data is stored on the memory 144 on the vehicle 100, or transmitted to the vehicle 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the vehicle 100, or transmitted to the vehicle 100 via a communications channel from the remotely located database 134.

Computer processors 146 located on the vehicle 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the vehicle 100. In an embodiment, peripherals 132 are similar to the display 312, input device 314, and cursor controller 316 discussed below in reference to FIG. 3. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
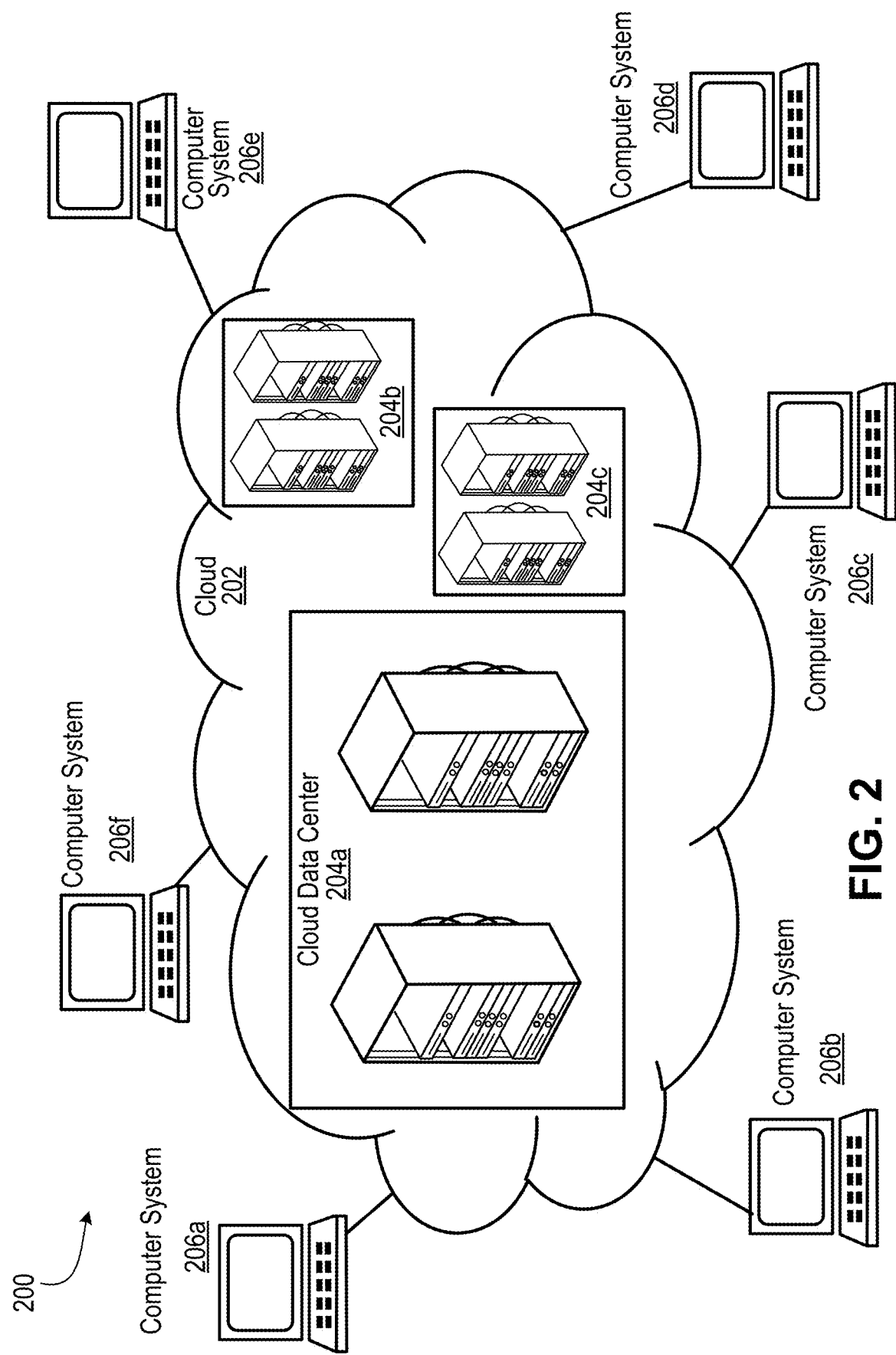
FIG. 2 shows an example "cloud" computing environment.

FIG. 2 shows an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
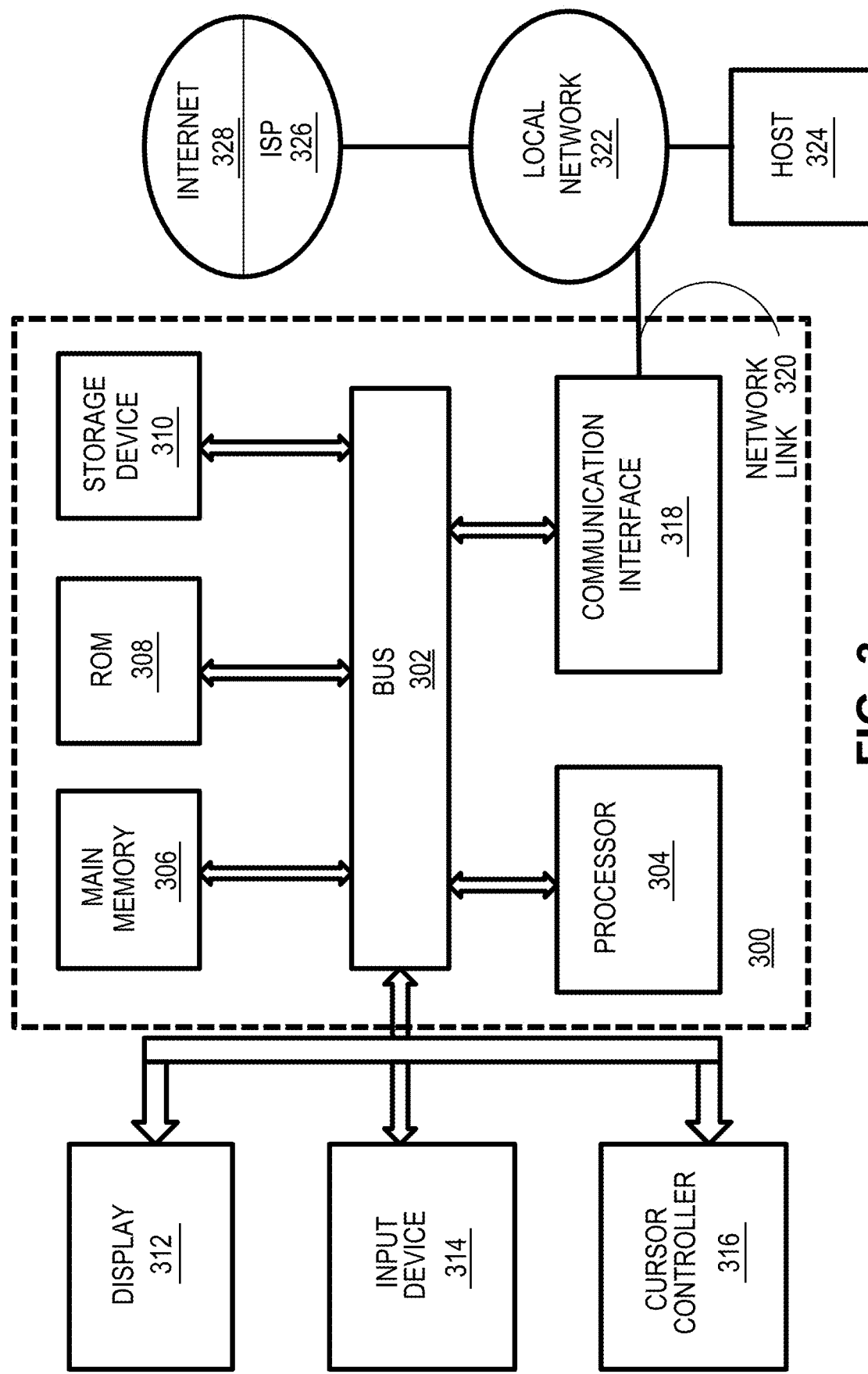
FIG. 3 shows a computer system.

FIG. 3 shows a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a processor 304 coupled with a bus 302 for processing information. The processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 can optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
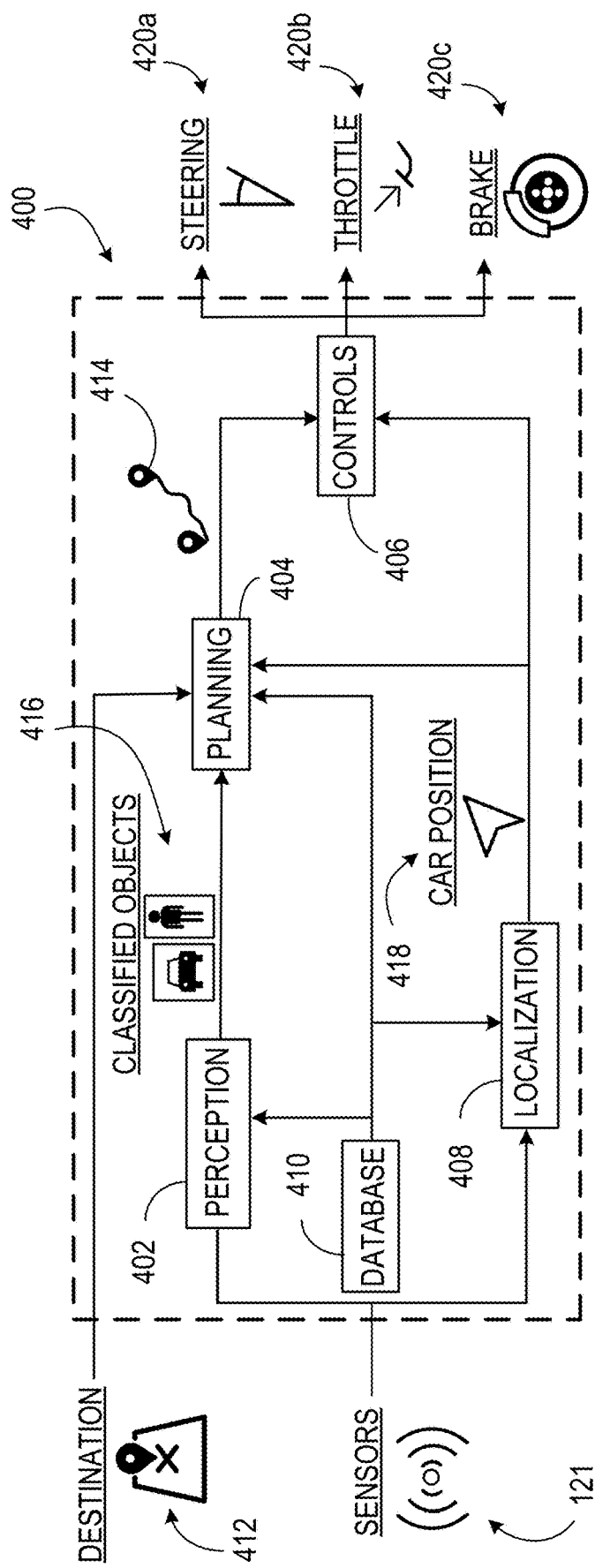
FIG. 4 shows an example architecture for an autonomous vehicle.

FIG. 4 shows an example architecture 400 for an autonomous vehicle (e.g., the vehicle 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the vehicle 100. Together, the modules 402, 404, 406, 408, and 410 can be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the vehicle 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the vehicle 100 to travel the trajectory 414 to the destination 412. For example, if the trajectory 414 includes a left turn, the control module 406 will operate the control functions 420a-c in a manner such that the steering angle of the steering function will cause the vehicle 100 to turn left and the throttling and braking will cause the vehicle 100 to pause and wait for passing pedestrians or vehicles before the turn is made.

Autonomous Vehicle Inputs

Figure 5:
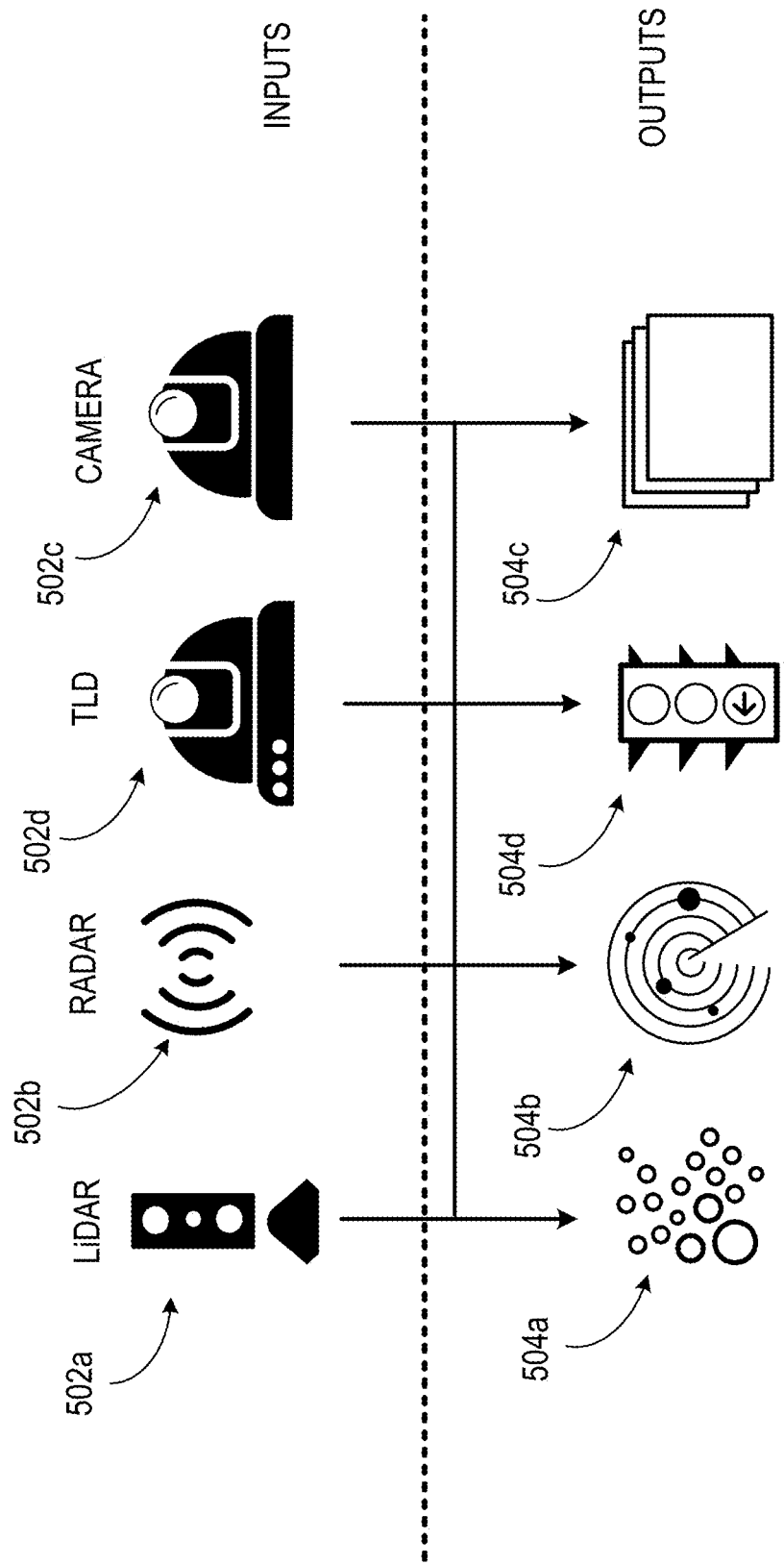
FIG. 5 shows an example of inputs and outputs that can be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the vehicle 100 has access to all relevant navigation information provided by these objects. For example, the viewing angle of the TLD system is about 120 degrees or more.

In some embodiments, outputs 504a-d are combined using a sensor fusion technique. Thus, either the individual outputs 504a-d are provided to other systems of the vehicle 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
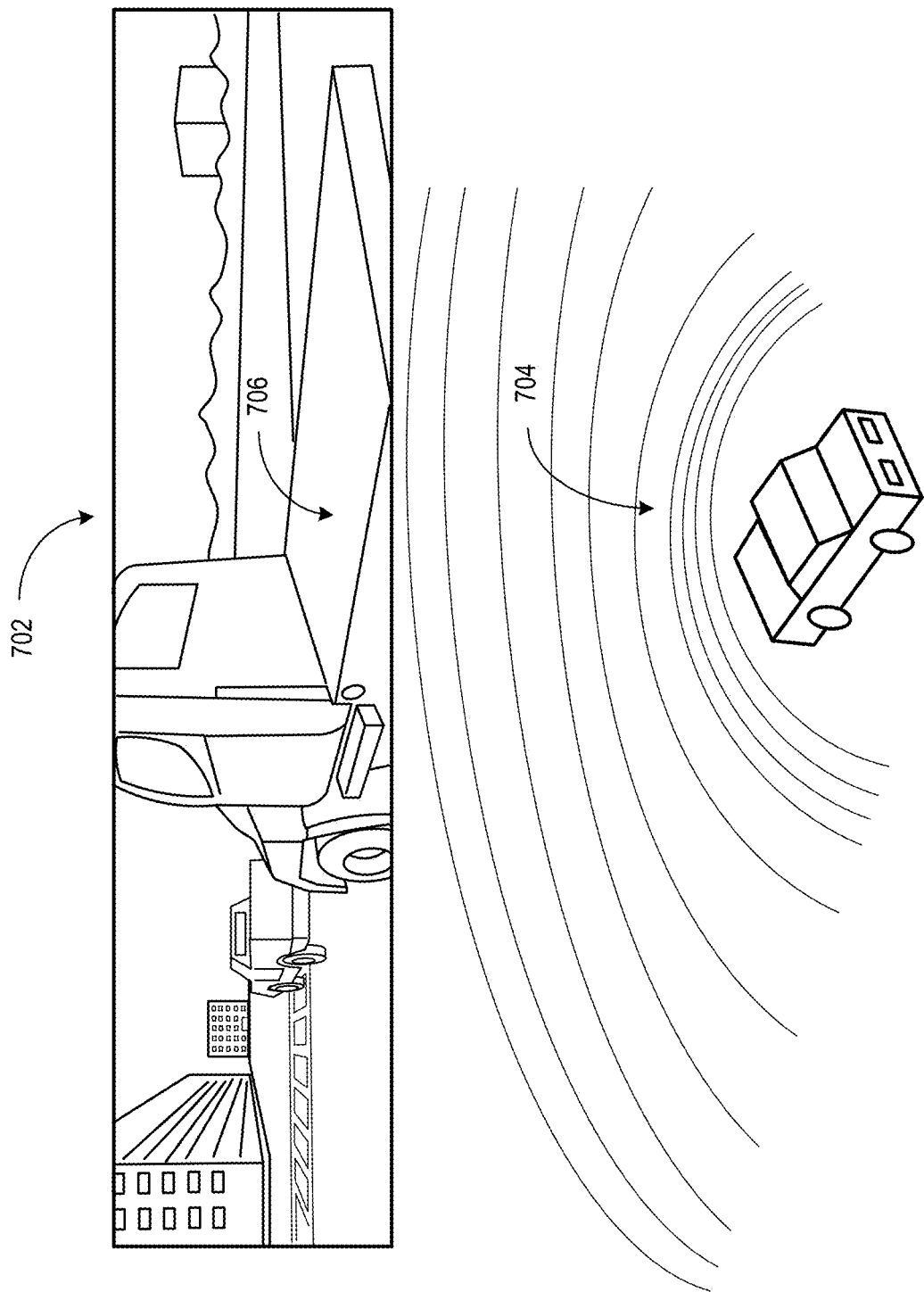
FIG. 7 shows the LiDAR system in operation.

FIG. 7 shows the LiDAR system 602 in operation. In the scenario shown in this figure, the vehicle 100 receives both camera system output 504c in the form of an image 702 and LiDAR system output 504a in the form of LiDAR data points 704. In use, the data processing systems of the vehicle 100 compares the image 702 to the data points 704. In particular, a physical object 706 identified in the image 702 is also identified among the data points 704. In this way, the vehicle 100 perceives the boundaries of the physical object based on the contour and density of the data points 704.

Figure 8:
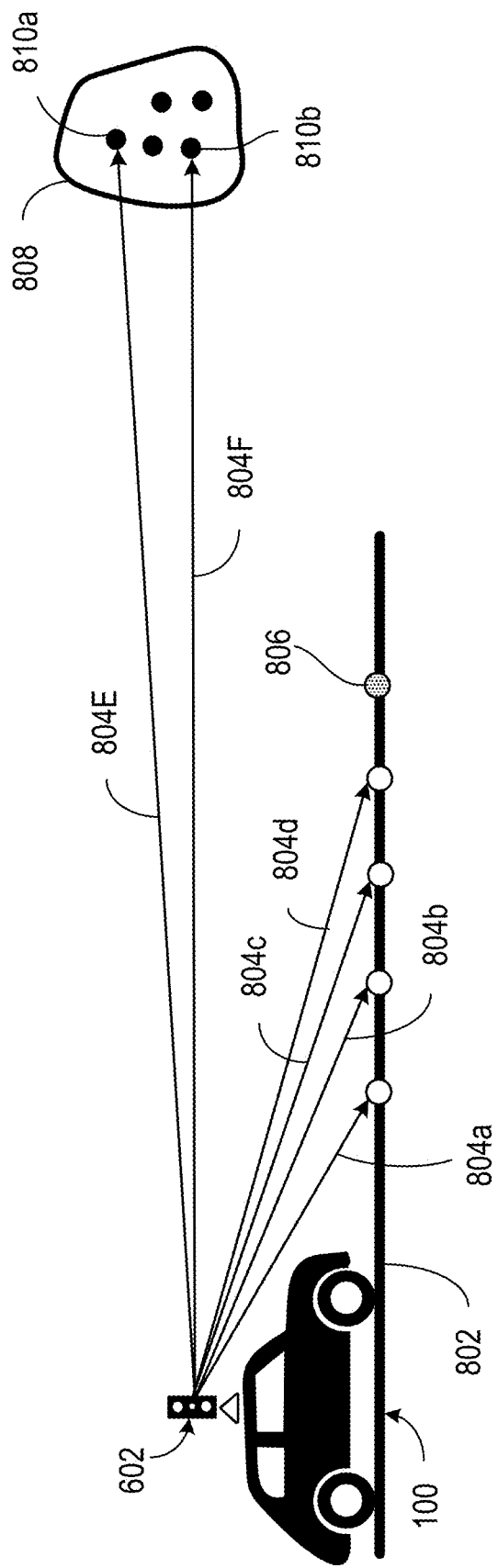
FIG. 8 shows the operation of the LiDAR system in additional detail.

FIG. 8 shows the operation of the LiDAR system 602 in additional detail. As described above, the vehicle 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the vehicle 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the vehicle 100 can determine that the object 808 is present.

Identifying Objects Using Multi-View Fusion

Figure 9:
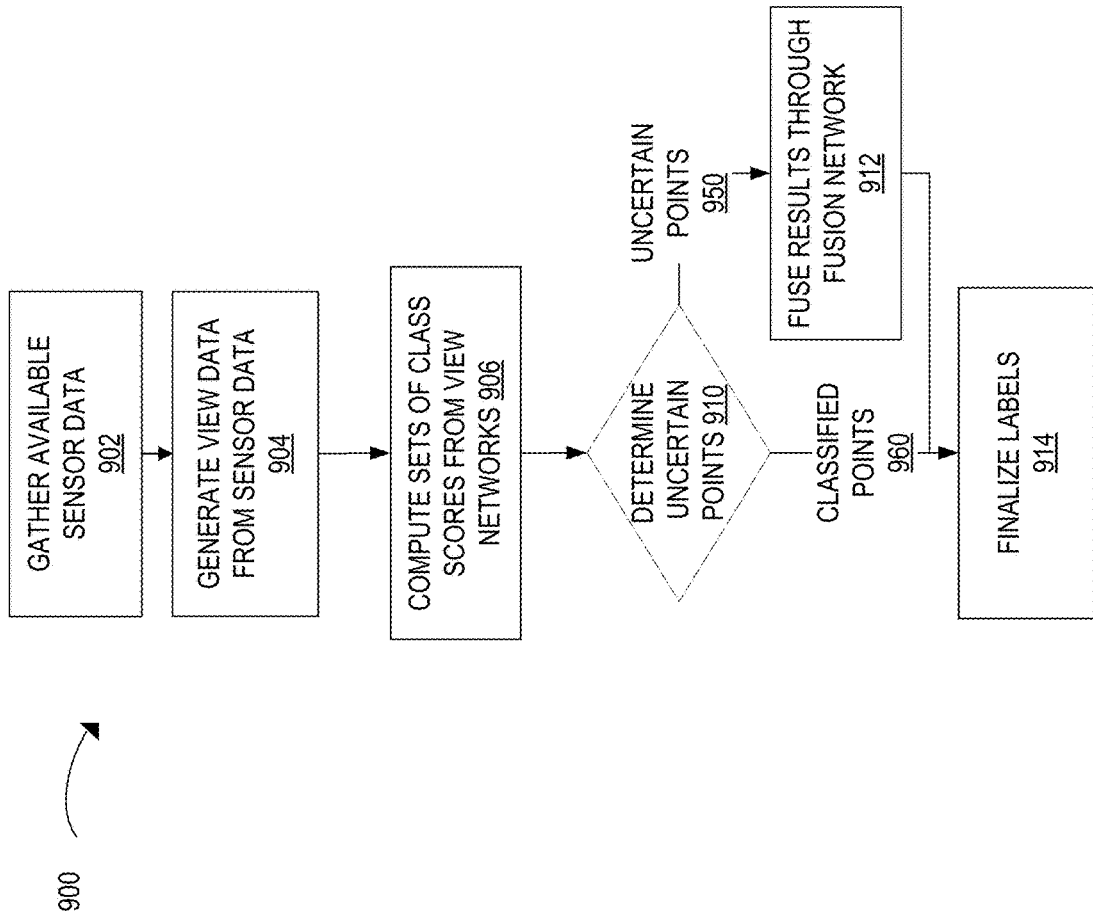
FIG. 9 shows a flowchart of an example process for classifying LiDAR points.

FIG. 9 shows a flowchart of a process 900 of classifying LiDAR points. As noted above with respect to FIG. 6, a vehicle 100 detects physical objects based on characteristics of data points 704 in the form of a point cloud detected by a LiDAR system 602. In some embodiments, the data points are processed by one or more neural networks to identify objects represented by the data points. For example, a point cloud is processed by neural networks to generate semantic labels for clusters of points included in the point cloud. The semantic labels are used to differentiate objects in the point cloud. Further, in some examples, multiple views of a point cloud are processed in parallel and fused to generate a finalized set of labels.

During the process 900, the point cloud data is generated from a LiDAR device 502a (FIG. 5). In some examples, the point cloud data is generated from a combination of LiDAR 502a and camera devices 502c (FIG. 5). In an embodiment, the received point cloud data includes 3-dimensional position information for each point in the point cloud. In an embodiment, the point cloud data includes point intensity data. Point intensity data represents the light intensity of a point in the point cloud. In an embodiment, the point intensity data is a real-valued number. In an embodiment where a combination of LiDAR 502a and camera devices 502c are utilized, the point cloud data includes color data of at least one point in the point cloud. Color data represents the color information of a point in the point cloud. In an embodiment, the color data is represented as a tensor including RGB data. The available sensor data, including the point cloud data or the camera data, is gathered 902.

The point cloud data is then projected onto two 2-dimensional surfaces to generate 904 view data. View data is a projection of 3-dimensional point cloud data onto a two 2-dimensional surface. For example, the point cloud data is projected onto a Birds-eye View (BeV) and a Range View (RV). View data is explained in detail below in accordance with FIG. 10 and FIG. 11.

The view data is provided to view networks. A view network is a type of encoder-decoder neural network (e.g., with or without point-level encoding) that generates a classification metric based on the input view data. In an embodiment where the input view data is an image, a view network outputs a segmentation map for the image. A segmentation map is a matrix made of labels, such that each element of the segmentation map is a label for a corresponding pixel in the input view image data. Each of the view networks takes the view data as inputs and computes 906 a set of class scores for each point in the point cloud data. A set of class scores is an n-dimensional vector, in which n is the number of pre-defined classes, and in which each element of the vector represents a likelihood score of a class to which the point belongs. A class reflects an object type, e.g., vegetation, vehicle or pedestrian. Further details about view networks are found below in accordance with FIG. 11.

The different sets of class scores of a point in the point cloud data are obtained and compared. Based on the result of the comparison, the point is then determined 910 as either an uncertain point 950 or a classified point 960. Details regarding the comparison process are found below in accordance with FIG. 10.

A finalized 914 label is a label assigned to a point in the point cloud to indicate that the point is part of an object, e.g., vegetation, vehicle or pedestrian, of a point. In most instances, classified points 960 show the same dominant class from the different sets of class scores, and hence the finalized label of the classified points 960 is the dominant class from a set of class scores. An uncertain point 950, however, usually does not show the same dominant class from the different sets of class scores and requires additional processing to determine a finalized label for the uncertain point.

A fusion network, also known as a fusion neural network, takes an uncertain point and generates, through fusing 912, a new set of class scores for the uncertain point. A fusion network is a type of neural network that fuses the final or intermediate outputs of view networks for a point in the point cloud to generate a more accurate result. In an embodiment, the new set of class scores shows a dominant class that is used as the finalized 914 label for the uncertain point 950. Details regarding the comparison process are found below in accordance with FIG. 12.

In an embodiment, the finalized labels of the points in the point cloud are then passed to a perception circuit 402 shown in FIG. 4 for tasks such as object recognition. Details regarding the subsequent tasks are found below in accordance with FIG. 10.

Figure 10:
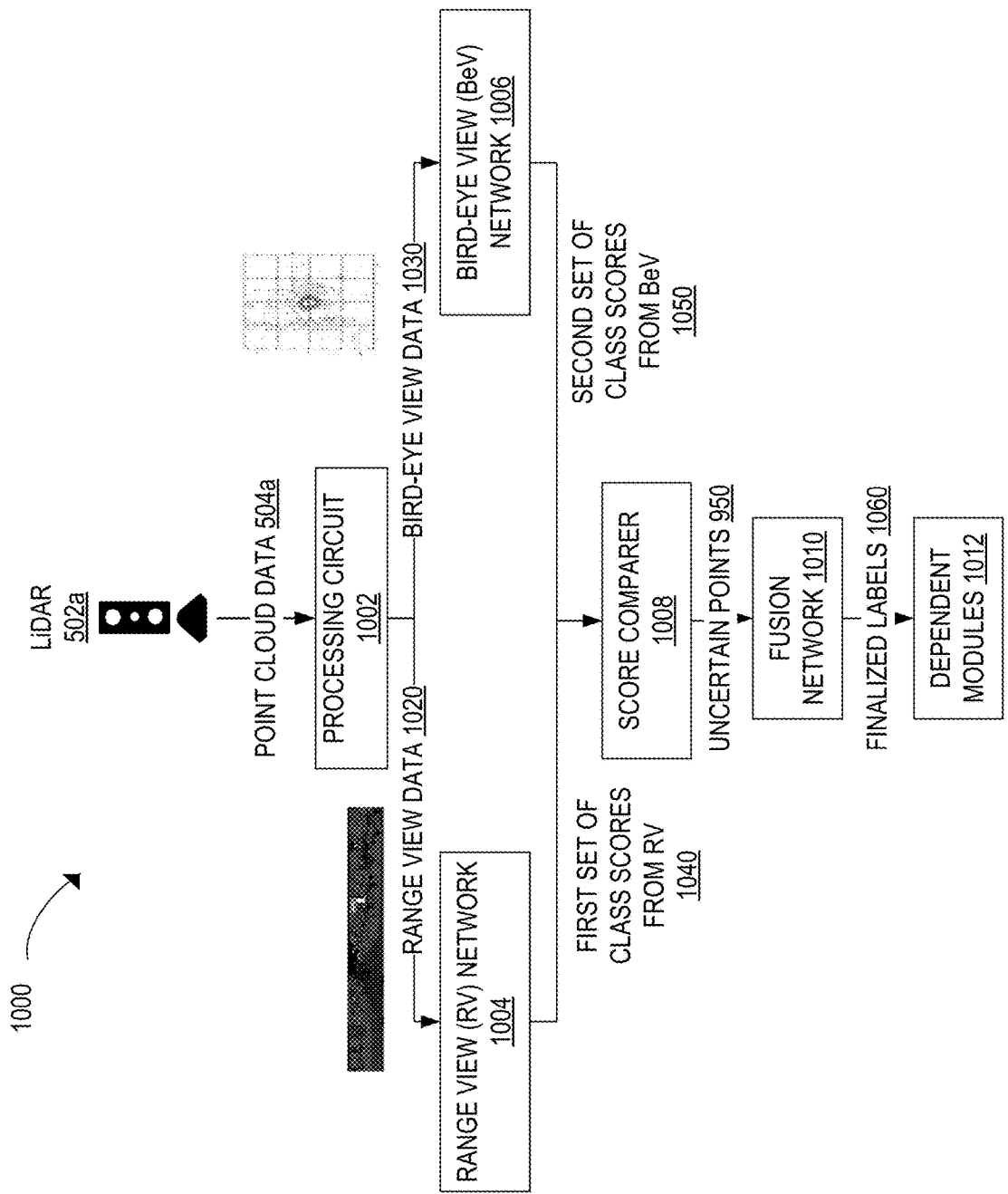
FIG. 10 shows a block diagram of an example classification network.

FIG. 10 illustrates a block diagram of classification network 1000 used to classify LiDAR scan points. The classification network 1000 takes, as input, the point cloud data 1003 obtained from a LiDAR device 1001 (e.g., LiDAR 502a shown in FIG. 5), and generates finalized labels 1060 for each point in the point cloud data 1003. A finalized label 1060 is a label assigned to a point in the point cloud that the point is part of an object, e.g., vegetation, vehicle or pedestrian.

The point cloud data is received and processed using a processing circuit 1002, which is a localization circuit 408 (FIG. 4) or a perception circuit 402 (FIG. 4), based on the order of subsequent tasks performed. The 3-dimensional point cloud data 1003 is projected, using the processing circuit 1002, onto two 2-dimensional surfaces. One projection is as if the point cloud is unwrapped from a spherical surface on to a flat surface, similar to the projection of the earth onto a world map, which is called the Range View (RV) data 1020. In other words, the Range View (RV) data 1020 is the 3-dimensional point cloud data in a spherical coordinate system mapped onto a xy-coordinate system, with each x-coordinate representing each φ (phi) angle. Another projection is as if the point cloud is viewed from above, which is called the Bird-eye View (BeV) data 1030. In other words, the Bird-eye View (BeV) data 1030 is the 3-dimensional point cloud data in xyz-coordinate system mapped onto a xy-coordinate system, with z-axis removed. The RV data 1020 and BeV data 1030 takes multiple formats. In an example, the RV data 1020 and BeV data 1030 takes the format of images. In another example, the RV data 1020 and BeV data 1030 takes the format of matrices.

Figure 11:
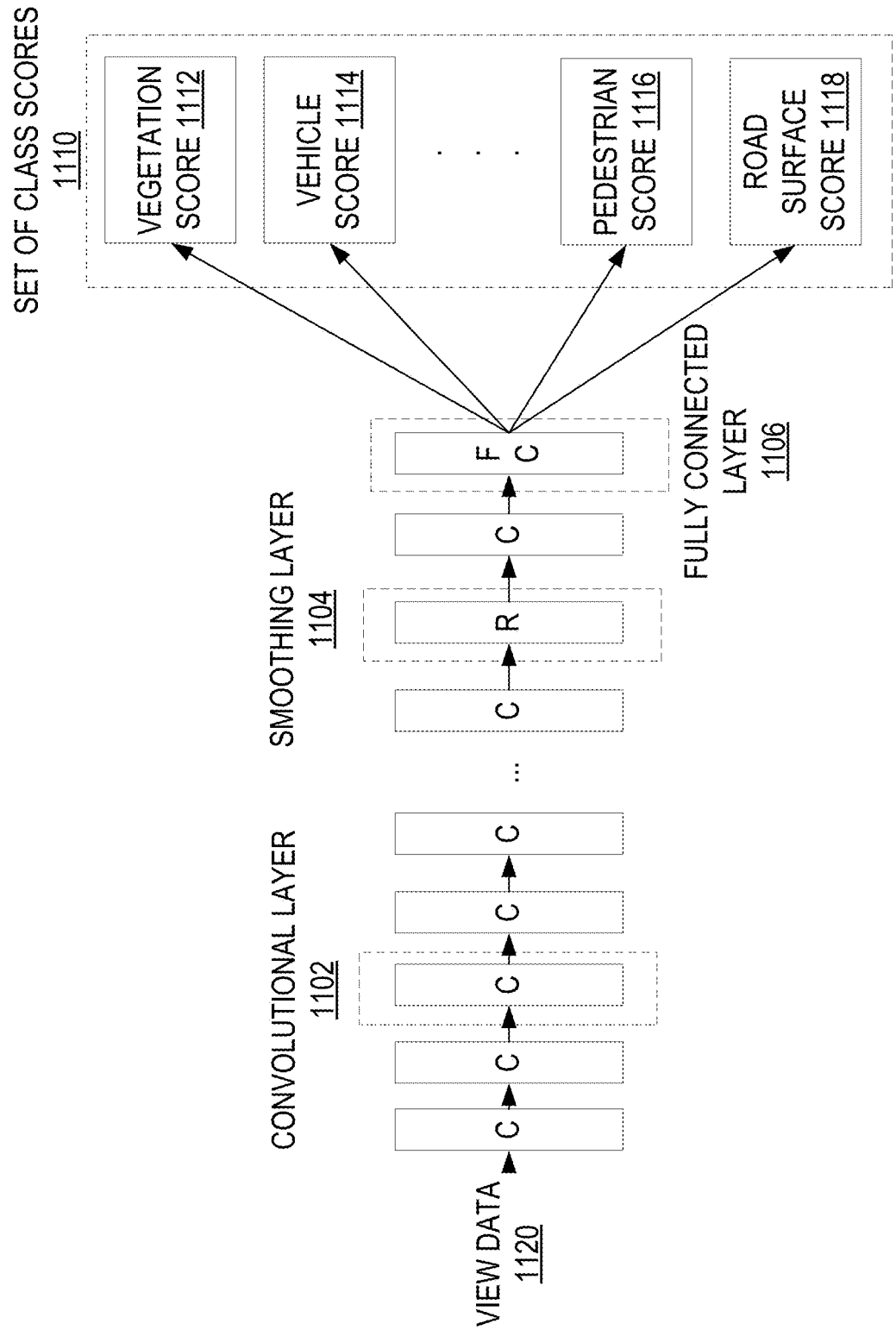
FIG. 11 shows a representation of an example view network.

The RV data 1020 is provided as an input to a Range View network 1004, or an RV network and BeV data 1030 to a Bird-eye View network 1006, or a BeV network. In an embodiment, both the RV network 1004 and the BeV network 1006 are view networks. Detailed architecture of a view network representative of The RV network 1004 and BeV network 1006 is illustrated in FIG. 11. The RV network 1004 calculates, for each point in the point cloud, a first set of class scores 1040. Likewise, the BeV network 1006 calculates, for each point in the point cloud, a second set of class scores 1050.

The RV network 1004 and BeV network 1006 are independent neural networks that do not depend on each other for either input or calculation. In an embodiment, the RV network 1004 and BeV network 1006 are evaluated in parallel using two different processors. In an embodiment, one of the two different processors used is the processor 304 shown in FIG. 3 while the other processor used is part of the cloud 202 shown in FIG. 2. In another embodiment, both of the processors are located in the cloud 202, or as an element of the AV. In an embodiment where computation resources are limited, The RV network 1004 and BeV network 1006 are evaluated in sequence so that computation resources capable of evaluating simultaneously only one of RV network 1004 or BeV network 1006 is utilized to evaluate both.

The first set of class scores 1040 of a point and the second set of class scores 1050 of the point are provided as the input to a score comparer 1008. If the two sets of scores 1040 and 1050 differ by a threshold, the point is then treated as an uncertain point 950. Otherwise the point is treated as a classified point 960. The threshold difference in the two sets of class scores 1040 and 1050 is dependent on the evaluation metrics chosen. As described above, each of the first set of class scores 1040 and the second set of class scores 1050 is represented by an n-dimensional vector. In an embodiment, the difference in the two sets of class scores 1040 and 1050 is calculated from the Cosine distance between the two vectors. In an embodiment, the difference in the two sets of class scores 1040 and 1050 is calculated from the Euclidean distance, or the distance in L2-norm, between the two vectors. In an embodiment, the difference in the two sets of class scores 1040 and 1050 is calculated from the Manhattan distance, or the distance in L1-norm, between the two vectors.

A fusion network 1010 takes as the input an uncertain point 950 and generates a new set of class scores 1220 for the uncertain point 950 based on first set of class scores 1040 and the second set of class scores 1050, given the difference between two sets of class scores 1040 and 1050 meets a threshold difference. A predicted class for the uncertain point is determined based on the new set of class scores 1220. In an embodiment, the predicted class for the uncertain point 950 is the dominant class corresponding to the maximum likelihood score in the new set of class scores 1220. The predicted class is treated as the finalized label 1060 for the uncertain point 950. Details regarding the fusion network and an example implementation of the fusion network is described in accordance with FIG. 12.

In an embodiment, the fusion network 1010 is expanded to include a finalizing module. For a classified point, the finalizing module takes either of the first set 1040 or the second set of class scores 1050, and determines the dominant class. In an embodiment, the dominant class corresponds to the maximum likelihood score in first set of class scores 1040 or the second set of class scores 1050. Then the classified point is assigned the dominant class, which serves as the finalized label 1060 for the classified point. For an uncertain point, the finalized label 1060 of the uncertain point is determined as the dominant class from a new set of class scores.

In an embodiment, the finalized labels 1060 of the points in the point cloud are provided to, e.g., a perception module 402 for tasks such as object recognition. For example, the perception module 402 applies a point cloud based object recognition algorithm, such as VoxelNet, to detect objects in the point cloud. In an embodiment, based on the objects detected, the planning module 404 (FIG. 4) outputs a strategy to follow the road or avoid collision with nearby vehicles.

FIG. 11 illustrates a view network 1100, which is representative of both the RV network 1004 and the BeV network 1006. The view network 1100 takes as the input view data 1120, which is representative of RV data 1020 or BeV data 1030, and output a set of class scores 1110. In an embodiment, the view data 1120 is passed through consecutive convolutional layers 1102. A convolutional layer is a layer in a neural network that performs convolution on the input to the layer. Convolution is an operation where a convolutional kernel, e.g., a 5×5 matrix, is convolved with the input tensor to produce a new tensor. In an embodiment, a convolutional layer is replaced with a transpose convolutional layer. A transpose convolutional layer is a layer in a neural network that performs up-sampling using transpose convolution on the input to the layer. Transpose convolution can be performed using convolution on the input with padded borders.

In an embodiment, multiple max-pooling layers, each of which extracts the dominant characteristics of input to the respective layer, are embedded in between successive convolutional layers 1102. A max-pooling layer is a layer in a neural network which performs max-pooling on the input to the layer. Max-pooling is a pooling operation that calculates the maximum in each patch, e.g., a 3×3 region of the input of each layer of the input tensor.

In an embodiment, an activation function is included in some of the convolutional layers 1102. An activation function is a function that rectifies the output of a layer. For instance, the activation function is a sigmoid function or a Rectified Linear Unit (ReLU) function.

A spatial smoothing layer 1104 implemented using a recurrent layer or multiple successive recurrent layers is embedded in between successive convolutional layers 1102. A recurrent layer is a neural network layer that has internal memory. The memory is updated whenever there is a new input. The output is computed using both the current input and the internal memory. As a result, a recurrent layer is capable of learning sequential relationship in the inputs.

During training, in an embodiment, data augmentation is performed on the generated RV data 1020 or BeV data 1030. Data augmentation is a process of generating more training samples based on existing training samples. For instance, data augmentation on the RV data 1020 includes slicing the RV data into multiple smaller pieces. The smaller pieces helps the network to perform better on small objects. In addition, the data augmentation increases the number of training samples available.

In an embodiment, one or multiple successive fully connected layers 1106 is included in the view network 1100 before the output set of class scores 1110. A fully connected layer is a layer in a neural network where neurons in a fully connected layer have full connections to all outputs in the previous layer. A neuron in a neural network is a component that has learnable weights and biases. In another embodiment, the fully connected layers 1106 are replaced with convolutional layers 1102. During training, the weights and biases of each neuron in the neural network is updated so that the actual output of the neural network converges to the desired output of the neural network. In an embodiment, the update is performed via backpropagation. Backpropagation is a process where the gradient of the difference between the actual output and the desired output with respect to each of the weights of the neural network is propagated. The difference between the actual output and the desired output is calculated according to a loss function. A loss function is a metric designed to calculate the error between the actual output and the desired output.

The output set of class scores 1110 for a point comprises likelihood scores of distinct classes, such as vegetation score 1112, the likelihood score that the point belongs to part of some vegetation, vehicle score 1114, the likelihood score that the point belongs to part of some vehicle, pedestrian score 1116, the likelihood score that the point belongs to part of some pedestrian, and road surface score 1118, the likelihood score that the point belongs to part of some road surface.

Figure 12:
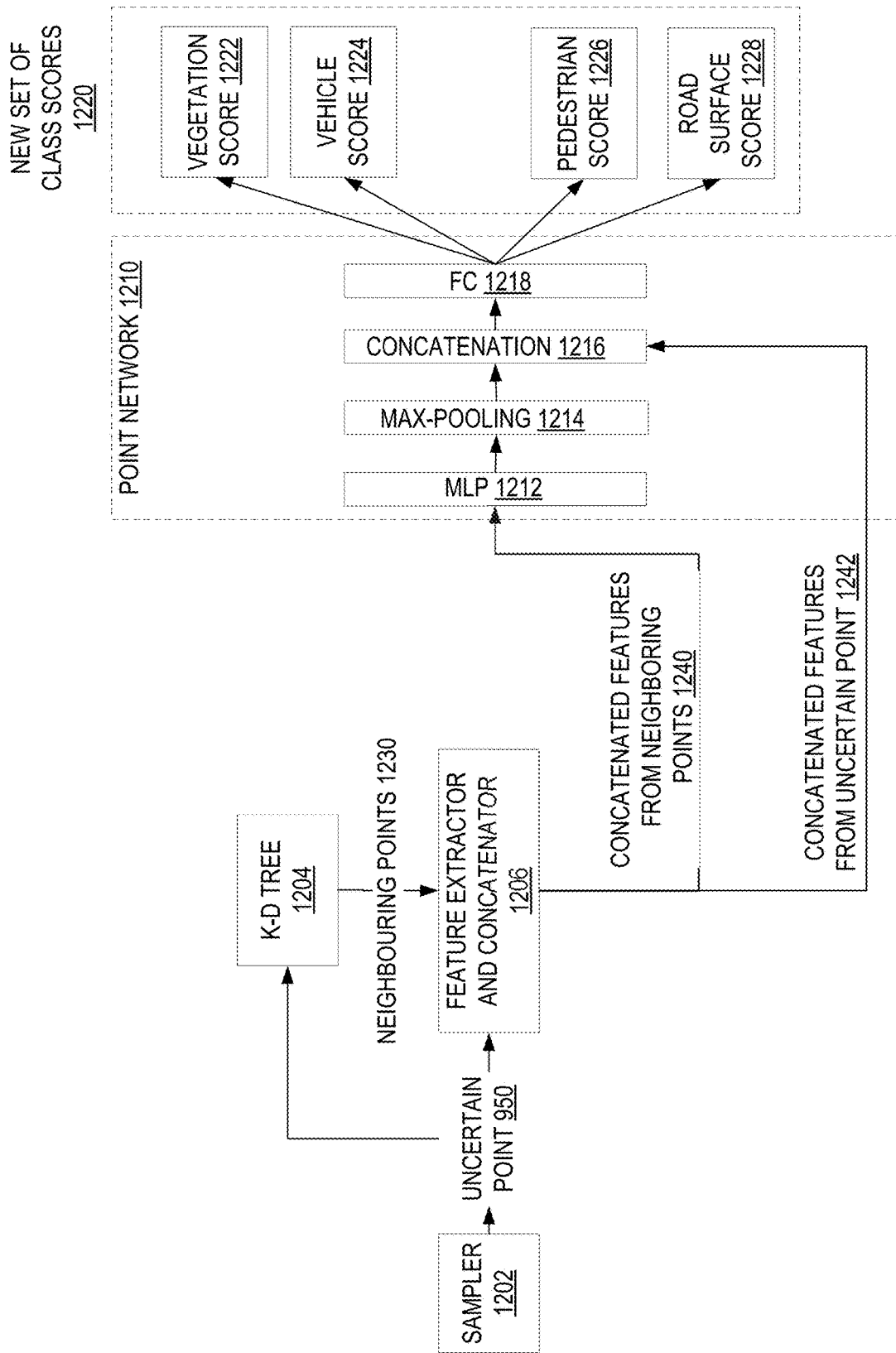
FIG. 12 shows a representation of an example fusion network.

FIG. 12 shows a representation of a fusion network 1200. The fusion network 1200 takes as input an uncertain point 950 and outputs a new set of class scores 1220 for the uncertain point 950.

During training, a sampler 1202 is used to filter the uncertain points 950 such that only a portion of the uncertain points 950 are evaluated. This increases the training speed. In an embodiment, the sampler 1202 is implemented using a probability function. In an embodiment, the sampler 1202 is implemented using a filtering function. The sampler 1202 is used to specify a threshold for the difference in the two sets of class scores 1040 and 1050. During deployment, all of the uncertain points 950 are considered.

In an embodiment, a K-Dimensional Tree (K-D Tree) 1204 selects the neighboring points 1230 of an uncertain point 950. A K-D Tree is a multidimensional binary search tree structure for organizing points in a k-dimensional space, which is useful for nearest neighbor searches. The neighboring points 1230 are provided as the input to a feature extractor and concatenator 1206. A neighboring point 1230 of an uncertain point 950 is a point in the proximity of the uncertain point 950. In an embodiment, the K-D Tree is replaced with another nearest neighbor search algorithm, such as linear search.

Features are defined as the output from a layer of a view network 1100. In an embodiment, the feature extractor and concatenator 1206 takes as input the uncertain point 950 and extracts features of the neighboring points 1230 and the uncertain point 950 from corresponding view networks 1100 to form concatenated features as the input to a point neural network 1210, or a point network. In an embodiment, the features are the output from an intermediate layer of a view network 1100. In an embodiment, the output from an intermediate layer of a view network 1100 is a tensor. In an embodiment, the features are the output from the final layer of a view network 1100, or the sets of output class scores 1110. In an embodiment, the features include unprocessed point cloud data read from the LiDAR device, the 3-dimensional position information of the neighboring points, or the point intensity information of the neighboring points.

In an embodiment, the concatenated features from neighboring points 1240 includes raw point cloud data, the 3-dimensional position information of the neighboring points relative to the uncertain point, or the point intensity information of the neighboring points. In an embodiment, the concatenated features from the uncertain point 1242 includes raw point cloud data, the 3-dimensional position information of the uncertain point, or the point intensity information of the uncertain point.

The point network 1210 takes as inputs concatenated features from neighboring points 1240 and concatenated features from the uncertain point 1242. In an embodiment, the concatenated features from neighboring points 1240 are taken as the input by a multi-layer perceptron 1212, which outputs some condensed form of features of the concatenated features from uncertain point 1242. A multi-layer perceptron 1212 is a neural network where every node of the neural network is a perceptron. A perceptron is an algorithm for learning a binary classifier. In an embodiment, the multi-layer perceptron 1212 is replaced by a convolutional neural network. In an embodiment, the multi-layer perceptron 1212 is replaced by a transformer. A transformer is a type of neural network that transforms an input sequence to an output sequence.

The output from the multi-layer perceptron 1212 is then provided to a max-pooling layer 1214. The max-pooling layer 1214 extracts dominant characteristics from the neighboring points. In an embodiment, the dominant characteristics is then concatenated together with the concatenated features from uncertain point 1242 via a concatenation layer 1216. The output from the concatenation layer 1216 is fed to a fully connected layer 1218. In an embodiment, the concatenation layer 1216 is replaced by a layer that performs conjoining or stacking. In an embodiment, the fully connected layer 1218 is replaced by a convolutional layer.

The output of the fully connected layer is the new set of class scores 1220 for the uncertain point 950. The new set of class scores 1220 comprises likelihood scores of distinct classes, such as vegetation score 1222, the likelihood score that the point belongs to part of some vegetation, vehicle score 1224, the likelihood score that the point belongs to part of some vehicle, pedestrian score 1226, the likelihood score that the point belongs to part of some pedestrian, and road surface score 1228, the likelihood score that the point belongs to part of some road surface.

Usually, the new set of class scores 1220 of the uncertain point 950 is significantly different from either first set of class scores 1040 of the uncertain point 950 or the second set of class 1050 scores of the uncertain point 950, based on a distance metrics chosen, such as the Cosine distance or the Euclidean distance. Thus, the uncertain point 950 can be assigned a finalized label 1060 based on the new set of class scores 1220. In an embodiment, the finalized label 1060 of the uncertain point 950 is the class corresponding to the maximum likelihood score in the new set of class scores 1220.

Figure 13:
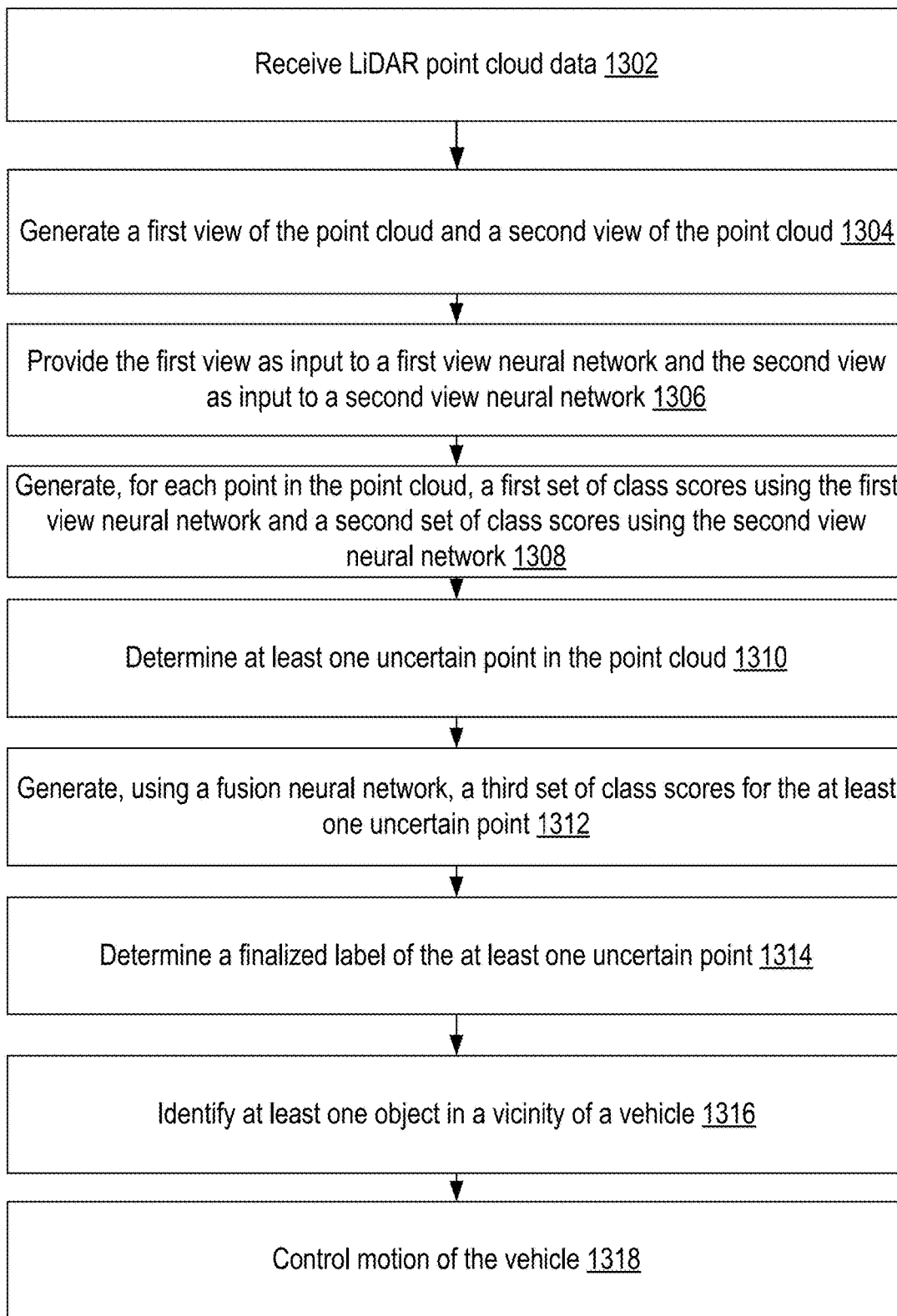
FIG. 13 shows a flowchart of an example process for operating a vehicle based on classified LiDAR points.

FIG. 13 shows a flowchart of a process 1300 for operating a vehicle based on classified LiDAR points. In an embodiment, the vehicle is the AV 100 shown in FIG. 1. In an implementation, the process 1300 is carried out by a processor such as the processor 304 shown in FIG. 3. In an implementation, the process 1300 is carried out by the perception module 402, the planning module 404, the control module 406 or the localization module 408 shown in FIG. 4.

The processor receives 1302 point cloud data. In an implementation, the point cloud data is the point cloud data 1003 generated from a LiDAR device 1001 as shown in FIG. 10. In an implementation, the LiDAR point cloud data comprises information about a color associated with at least one point included in the point cloud. In an implementation, the LiDAR point cloud data comprises point intensity information.

The processor generates 1304 a first view of the point cloud and a second view of the point cloud based on the plurality of points in the point cloud, wherein the second view is different from the first view. In an implementation, the first view of the point cloud is the Range View (RV) data 1020 shown in FIG. 10. In an implementation, the second view of the point cloud is the Bird-eye View (BeV) data 1040 shown in FIG. 10.

The processor provides 1306 the first view as input to a first view neural network and the second view as input to a second view neural network, the second view neural network different from the first view neural network. In an implementation, the first view is the Range View (RV) data 1020 and the first view neural network is the Range View (RV) network 1004 shown in FIG. 10. In an implementation, the second view is the Bird-eye View (BeV) data 1040 and the second view neural network is the Range View (RV) network 1006 shown in FIG. 10. In an implementation, the first view neural network or the second view neural network comprises at least one recurrent layer, such as the spatial smoothing layer 1104 shown in FIG. 11. In an implementation, while training the first view neural network or the second view neural network, the first view data or the second view data is generated at least in part based on data augmentation as described with respect to FIG. 11.

The processor generates 1308, for each point in the point cloud, a first set of class scores indicative of object classes using the first view neural network, and a second set of class scores indicative of the object classes using the second view neural network, wherein the first set of class scores and the second set of class scores are generated in parallel. In an embodiment, the first set of class scores is the first set of class scores from RV 1040 shown in FIG. 10. In an embodiment, the second set of class scores is the second set of class scores from BeV 1050 shown in FIG. 10. In an implementation, the at least one class score included in the first set of class scores or the second set of class scores of a particular point corresponds to a pre-defined class of object.

The processor determines 1310 at least one uncertain point in the point cloud, wherein the determining is based on the first set of class scores of the at least one uncertain point and the second set of class scores of the at least one uncertain point. In an implementation, the first and second set of class scores are compared in the score comparer 1008 shown in FIG. 10. In an implementation, the at least one uncertain point is the uncertain point 950 shown in FIG. 9. In an implementation, the uncertain point is determined with respect to a threshold difference in class scores, wherein the threshold difference is determined based on at least one of a probability function or a filtering function or both, as described with respect to FIG. 10. In an implementation, a point determined as not an uncertain point is a classified point 960.

The processor generates 1312, using a fusion neural network, a third set of class scores based on the at least one of the first set of class scores of the at least one uncertain point and the second set of class scores of the at least one uncertain point, wherein the third set of class scores is based on characteristics of neighboring points of the at least one uncertain point. In an embodiment, the third set of class scores of the at least one uncertain point is the new set of class scores 1220 shown in FIG. 12. In an implementation, at least one class score in the third set of class scores of the at least one uncertain point corresponds to a pre-defined class of object. In an implementation, the fusion neural network comprises at least one recurrent layer. In an implementation, the fusion neural network includes at least one of a multi-layer perceptron or a convolutional layer, such as the multi-layer perceptron 1212 shown in FIG. 12 or the convolutional layer shown in FIG. 11.

The processor determines 1314, based on the third set of class scores, a finalized label of the at least one uncertain point. In an implementation, the finalized label is an object class, for example, vegetation, vehicle, pedestrian or road surface, associated with the elements in the new set of class scores 1220, such as vegetation score 1222, vehicle score 1224, pedestrian score 1226 or road surface score 1228 shown in FIG. 12. In an implementation, a class score for the at least one uncertain point is determined based on concatenated features of neighboring points of the at least one uncertain point, such as the concatenated features described with respect to FIG. 12. In an implementation, the concatenated features comprise intermediate output of intermediate layers of the first view neural network and the second view neural network, such as the output from an intermediate layer of a view network 1100 as described with respect to FIG. 11. In an implementation, the concatenated features comprise the output class scores from the at least one of the first view neural network and the second view neural network, such as the sets of output class scores 1110 shown in FIG. 11. In an implementation, a finalized label for at least one classified point is also determined using the finalizing module described with respect to FIG. 10.

The processor identifies 1316 at least one object in a vicinity of a vehicle based at least in part on the finalized label of the at least one uncertain point. In an implementation, the object is a part of vegetation, a vehicle, a pedestrian or road surface, as associated with the elements in the new set of class scores 1220, such as vegetation score 1222, vehicle score 1224, pedestrian score 1226 or road surface score 1228 shown in FIG. 12. In an implementation, the identifying is based at least in part on the finalized label of the at least one classified point.

The processor control 1318 motion of the vehicle. In an implementation, the processor is the planning module 404, the control module 406 or the localization module 408 which controls the vehicle to follow a planned path for the vehicle to avoid colliding with a known object.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
   receiving, using at least one processor, LiDAR point cloud data associated with a plurality of points in a point cloud;
   generating, using the at least one processor, a Birds-eye View (BeV) of the point cloud and a Range View (RV) of the point cloud based on the plurality of points in the point cloud, wherein the RV is different from the BeV;
   providing, using the at least one processor, the BeV as input to a first view neural network and the RV as input to a RV neural network, the RV neural network different from the BeV neural network;
   generating, using the at least one processor, for each point in the point cloud, a first set of class scores indicative of object classes using the BeV neural network, and a second set of class scores indicative of the object classes using the RV neural network, wherein the first set of class scores and the second set of class scores are generated in parallel;
   determining, using the at least one processor, a finalized label for at least one point in the point cloud, wherein the determining is based on the first set of class scores of the at least one point and the second set of class scores of the at least one point;
   identifying, using the at least one processor, at least one object in a vicinity of a vehicle based at least in part on the finalized label of the at least one point; and
   controlling, using the at least one processor, motion of the vehicle based on the at least one object.

2. The method of claim 1, wherein the determining a finalized label for at least one point in the point cloud comprises:
   determining at least one uncertain point in the point cloud, wherein the determining is based on the first set of class scores of the at least one uncertain point and the second set of class scores of the at least one uncertain point;
   generating, using a fusion neural network, a third set of class scores for the at least one uncertain point based on the at least one of the first set of class scores of the at least one uncertain point and the second set of class scores of the at least one uncertain point, wherein the third set of class scores is based on characteristics of neighboring points of the at least one uncertain point; and
   based on the third set of class scores, determining, using the at least one processor, a finalized label of the at least one uncertain point.

3. The method of claim 1, wherein the LiDAR point cloud data comprises information about a color associated with at least one point included in the point cloud.

4. The method of claim 1, wherein the LiDAR point cloud data comprises point intensity information.

5. The method of claim 2, wherein at least one class score included in the first set of class scores, the second set of class scores or the third set of class scores of a particular point corresponds to a pre-defined class of object.

6. The method of claim 2, wherein at least one of the BeV neural network, the RV neural network, and the fusion neural network comprises at least one recurrent layer.

7. The method of claim 1, wherein providing the BeV data as input to the BeV neural network and the RV data as input to the RV neural network comprises:
providing the BeV data as input to the BeV neural network and the RV data as input to the RV neural network, the BeV data or the RV data generated at least in part based on data augmentation.

8. The method of claim 1, wherein the uncertain point is determined with respect to a threshold difference in class scores, wherein the threshold difference is determined based on at least one of a probability function or a filtering function or both.

9. The method of claim 1, wherein a class score for the at least one uncertain point is determined based on concatenated features of neighboring points of the at least one uncertain point.

10. The method of claim 9, wherein the concatenated features comprise intermediate output of intermediate layers of the BeV neural network and the RV neural network.

11. The method of claim 9, wherein the concatenated features comprise the output class scores from the at least one of the BeV neural network and the RV neural network.

12. The method of claim 2, wherein the fusion neural network includes at least one of a multi-layer perceptron or a convolutional layer.

13. A vehicle, comprising:
at least one LiDAR device capable of generating a LiDAR scan point cloud that includes a plurality of LiDAR data points; and
a processing circuit coupled to the LiDAR device, the processing circuit configured for:
receiving LiDAR point cloud data associated with a plurality of points in a point cloud;
generating a Birds-eye View (BeV) of the point cloud and a Range View (RV) of the point cloud based on the plurality of points in the point cloud, wherein the RV is different from the BeV;
providing the BeV as input to a BeV neural network and the RV as input to a RV neural network, the RV neural network different from the BeV neural network;
generating for each point in the point cloud, a first set of class scores indicative of object classes using the BeV neural network, and a second set of class scores indicative of the object classes using the RV neural network, wherein the first set of class scores and the second set of class scores are generated in parallel;
determining a finalized label for at least one point in the point cloud, wherein the determining is based on the first set of class scores of the at least one point and the second set of class scores of the at least one point;
identifying at least one object in a vicinity of a vehicle based at least in part on the finalized label of the at least one point; and
controlling motion of the vehicle based on the at least one object.

14. The vehicle of claim 13, wherein determining a finalized label for at least one point in the point cloud comprises:
determining at least one uncertain point in the point cloud, wherein the determining is based on the first set of class scores of the at least one uncertain point and the second set of class scores of the at least one uncertain point;
generating, using a fusion neural network, a third set of class scores for the at least one uncertain point based on the at least one of the first set of class scores of the at least one uncertain point and the second set of class scores of the at least one uncertain point, wherein the third set of class scores is based on characteristics of neighboring points of the at least one uncertain point; and
based on the third set of class scores, determining a finalized label of the at least one uncertain point.

15. The vehicle of claim 13, wherein the LiDAR point cloud data comprises information about a color associated with at least one point included in the point cloud.

16. The vehicle of claim 13, wherein the LiDAR point cloud data comprises point intensity information.

17. The vehicle of claim 14, wherein at least one class score included in the first set of class scores, the second set of class scores or the third set of class scores of a particular point corresponds to a pre-defined class of object.

18. The vehicle of claim 14, wherein at least one of the BeV neural network, the RV neural network, and the fusion neural network comprises at least one recurrent layer.

19. The vehicle of claim 13, wherein providing the BeV data as input to the BeV neural network and the RV data as input to the RV neural network comprises:
providing the BeV data as input to the BeV neural network and the RV data as input to the RV neural network, the BeV data or the RV data generated at least in part based on data augmentation.

20. The vehicle of claim 13, wherein the uncertain point is determined with respect to a threshold difference in class scores, wherein the threshold difference is determined based on at least one of a probability function or a filtering function or both.

21. The vehicle of claim 13, wherein a class score for the at least one uncertain point is determined based on concatenated features of neighboring points of the at least one uncertain point.

22. The vehicle of claim 21, wherein the concatenated features comprise intermediate output of intermediate layers of the BeV neural network and the RV neural network.

23. The vehicle of claim 21, wherein the concatenated features comprise the output class scores from the BeV neural network and the RV neural network.

24. The vehicle of claim 14, wherein the fusion neural network includes at least one of a multi-layer perceptron or a convolutional layer.

* * * * *